US009811614B2

(12) United States Patent
Jacobs et al.

(10) Patent No.: US 9,811,614 B2
(45) Date of Patent: Nov. 7, 2017

(54) SYSTEM AND METHOD FOR CORRECTING A MODEL-DERIVED VERTICAL STRUCTURE OF OCEAN TEMPERATURE AND OCEAN SALINITY BASED ON VELOCITY OBSERVATIONS

(71) Applicants: Gregg Arthur Jacobs, Slidell, LA (US); Scott R. Smith, Slidell, LA (US); Robert W. Helber, Slidell, LA (US)

(72) Inventors: Gregg Arthur Jacobs, Slidell, LA (US); Scott R. Smith, Slidell, LA (US); Robert W. Helber, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1030 days.

(21) Appl. No.: 14/023,030

(22) Filed: Sep. 10, 2013

(65) Prior Publication Data

US 2014/0278314 A1 Sep. 18, 2014

Related U.S. Application Data

(60) Provisional application No. 61/779,215, filed on Mar. 13, 2013.

(51) Int. Cl.
*G06F 17/50* (2006.01)
*G06F 17/16* (2006.01)
(Continued)

(52) U.S. Cl.
CPC .......... *G06F 17/5009* (2013.01); *G06F 17/16* (2013.01); *G01V 11/00* (2013.01); *G01W 1/10* (2013.01); *G06F 2217/16* (2013.01)

(58) Field of Classification Search
CPC ............. G06F 2217/16; G06F 17/5009; G06F 17/5018; G01V 11/00; G01W 1/10
See application file for complete search history.

(56) References Cited

U.S. PATENT DOCUMENTS 5,475,651 A * 12/1995 Bishop .................... G01S 7/539
367/124
5,568,450 A * 10/1996 Grande .................. G01S 7/527
367/131

(Continued)

FOREIGN PATENT DOCUMENTS

WO WO02-001258 1/2002

OTHER PUBLICATIONS

The international thermodynamic equation of seawater—2010: Calculation and use of thermodynamic properties, IOC, SCOR and IAPSO, 2010: Intergovernmental Oceanographic Commission, Manuals and Guides No. 56, UNESCO (English), 196 pp.

(Continued)

*Primary Examiner* — Akash Saxena
(74) *Attorney, Agent, or Firm* — US Naval Research Laboratory; Scott G. Bell

(57) ABSTRACT

System and method for correcting the vertical structure of the ocean temperature and salinity based on velocity observations. Three relations that can be precomputed are exploited: (1) the relation between temperature and salinity throughout a water column, (2) the relation between temperature/salinity and geopotential, and (3) the relation between geopotential and velocity. The relations are stored in a form that allows efficient application through a cross-correlation matrix.

9 Claims, 14 Drawing Sheets
(11 of 14 Drawing Sheet(s) Filed in Color)

(51) Int. Cl.
*G06F 17/22* (2006.01)
*G01W 1/10* (2006.01)
*G01V 11/00* (2006.01)

(56) References Cited

U.S. PATENT DOCUMENTS

| | | | | |
|---|---|---|---|---|
| 8,949,096 | B2* | 2/2015 | Jolliff | G06F 17/5009 703/2 |
| 9,335,258 | B2* | 5/2016 | Hanley | G01N 21/31 |
| 2003/0074140 | A1 | 4/2003 | Mackay | |
| 2004/0143396 | A1* | 7/2004 | Allen | G01W 1/10 702/3 |
| 2004/0176937 | A1* | 9/2004 | Jenny | G01V 11/00 703/10 |
| 2009/0034365 | A1* | 2/2009 | Coates | G01V 1/38 367/21 |
| 2009/0112477 | A1 | 4/2009 | Carvill | |
| 2010/0017176 | A1* | 1/2010 | Gangopadhyay | G06F 17/5009 703/5 |
| 2010/0082264 | A1* | 4/2010 | Barron | G01K 7/42 702/25 |
| 2011/0273958 | A1 | 11/2011 | Xia et al. | |
| 2012/0316848 | A1* | 12/2012 | Noh | G06F 17/5009 703/2 |
| 2013/0197880 | A1* | 8/2013 | Gallacher | G06F 17/5009 703/2 |
| 2013/0218536 | A1* | 8/2013 | Yu | G06F 17/13 703/2 |
| 2014/0278314 | A1* | 9/2014 | Jacobs | G06F 17/5009 703/9 |
| 2015/0317284 | A1* | 11/2015 | Takahashi | G06F 17/18 702/181 |
| 2016/0117423 | A1* | 4/2016 | Helber | G06F 17/5009 703/2 |

OTHER PUBLICATIONS

Fox, D. N., Barron, C. N., Carnes, M. R., Booda, M., Peggion, G. and Van Gurley, J., The Modular Ocean Data Assimilation System, Oceanography, vol. 15, No. 1, pp. 22-28, 2002.

Zhung, S.Y., Fu, W.W., She, J., A Pre-Operational Three Dimensional Variational Data Assimilation System in the North/Baltic Sea, Ocean Science, vol. 7, pp. 771-781, 2011.

Kurapov, A.L., Foley, D. Strub, P.T., Egbert, G.D., and Allen, J.S., Variational Assimilation of Satellite Observations in a Coastal Ocean Model off Oregon, Journal of Geophysical Research, vol. 116, pp. 1-19, 2011.

Oke, P. R., Allen, J.S., Miller, R. N., Egbert, G. D. and Kosro, P.M., Assimilation of surface velocity data into a primitive equation coastal ocean model, Journal of Geophysical Research, vol. 107, No. C9, 3122, pp. 5-1 through 5-25, 2002.

Oke, P. R., Schiller, A., Griffin, D.A. and Brassington, G.B., Ensemble Data Assimilation for an Eddy-resolving Ocean Model of the Australian Region, Quarterly Journal of the Royal Meteorological Society, vol. 131, pp. 3301-3311, 2005.

Dobricic, S., Pinardi, N., Adani, M., Bonazzi, A., Fratianni, C., Tonani, M., Mediterranean Forecasting System: An Improved Assimilation Scheme for Sea-Level Anomaly and its Validation, Quarterly Journal of the Royal Meteorological Society, vol. 131, pp. 3627-3642, 2005.

Jobricic, S., Pinardi, N., An Oceanographic Three-dimensional Variational Data Assimilation Scheme, Ocean Modelling, vol., 22, pp. 89-105, 2008.

Li, Z., Chao, Y., McWilliams, J. C., Ide, K., A Three-Dimensional Variational Data Assimilation Scheme for the Regional Ocean Modeling System, Journal of Atmospheric and Oceanic Technology, vol. 25, pp. 2074-2090, 2008.

Liu Y.E, Zhu J. She, J Zhuang, S., Fu, W., Gao, J., Assimilating Temperature and Salinity Profile Observations Using an Anisotropic Recursive Filter in a Coastal Ocean Model, Ocean Modelling, vol. 30, pp. 75-87, 2009.

Nilsson, J.A.U., Dobricic, S., Pinardi, N., Taillandier, V., Poulain, P-M., On the Assessment of Argo Float Trajectory Assimilation in the Mediterranean Forecasting System, Ocean Dynamics, vol. 61, pp. 1475-1490, 2011.

Nilsson, J.A.U., Dobricic, S., Pinardi, N., Poulain, P.-M., Pettenuzzo, D., Variational Assimilation of Lagrangian Trajectories in the Mediterranean Ocean Forecasting System, Ocean Science, vol. 8, pp. 249-259, 2012.

Pan, C., Yaremchuk, M., Nechaev, D., Ngodock, H., Variational Assimilation of Glider Data in Monterrey Bay, Journal of Marine Research, vol. 69, pp. 331-346, 2011.

Fan, S., Oey, L-Y., Hamilton, P., Assimilation of Drifter and Satellite Data in a Model of the Northeastern Gulf of Mexico, Continental Shelf Research, vol. 24, pp. 1001-1013, 2004.

Yaremchuk, M., Nechaev, D., Pan, C., A Hybrid Background Error Covariance Model for Assimilating Glider Data into a Coastal Ocean Model, Monthly Weather Review, vol. 139, pp. 1879-1890, Jun. 2011.

\* cited by examiner

SYSTEM AND METHOD FOR CORRECTING A MODEL-DERIVED VERTICAL STRUCTURE OF OCEAN TEMPERATURE AND OCEAN SALINITY BASED ON VELOCITY OBSERVATIONS

CROSS-REFERENCE TO RELATED APPLICATIONS

This Application is a non-provisional application claiming priority to provisional application 61/779,215 filed on Mar. 13, 2013, entitled SYSTEM AND METHOD FOR CORRECTING A MODEL-DERIVED VERTICAL STRUCTURE OF OCEAN TEMPERATURE AND OCEAN SALINITY BASED ON VELOCITY OBSERVATIONS under 35 USC 119(e). The entire disclosure of the provisional application is incorporated herein by reference.

BACKGROUND

Methods and systems disclosed herein relate generally to using ocean velocity measurements to correct ocean forecast models. Ocean forecast model corrections have historically been done using salinity and temperature profiles and satellite sea surface height (SSH). Correcting initial conditions of ocean velocity measurements can correct the vertical structure of the ocean temperature and salinity. Corrections to the initial conditions for a forecast can be made through ensemble methods. These methods typically require on the order of thirty instantiations of the forecast system, require substantial work to ensure the ensemble properly represents and spans the error probability density function of the state and thus requires large computational resources. Corrections to the initial conditions for the forecast can also be made through four dimensional variational methods. These methods require constructing a tangent linear model, the adjoint of the model, and the methods require running both the linear model and the adjoint several times in the analysis cycle to initialize the model forecast. This solution requires a substantial investment in developing the models and meeting the computational requirements to run the models. What is needed is a system that enables velocity observations of ocean currents from sources such as drifters at the surface or under water, and/or current meters either moored or on ships, to correct an ocean forecast model by using historical observations saved in a database to relate the observed velocity to temperature and salinity structure throughout the water column. The needed system could relate velocity measurements to salinity and temperature using historical observations. The needed system could enable the use of a plethora of existing, worldwide sources, for example, but not limited to, drifters and current meters, of current measurements for ocean model correction. The needed system could make use of the existing historical data to develop region specific velocity/salinity-temperature correlations. What is further needed is a computationally efficient method that is compatible with existing super-computer ocean forecasting systems operated daily to enable operational use.

SUMMARY

The system and method of the present embodiment can correct a vertical structure of the ocean temperature and salinity based on velocity observations. The system of the present embodiment can enable the use of ocean velocity measurements to correct ocean forecast models. In the present embodiment, three relations that can be precomputed are exploited: (1) the relation between temperature and salinity throughout a water column, (2) the relation between temperature/salinity and geopotential, and (3) the relation between geopotential and velocity. The relations are stored in a form that allows efficient application through a cross-correlation matrix. In the present embodiment, historical observations can be used to construct the relation between temperature (T) and salinity (S) variations throughout the water column. The cross-correlation between T and S and geopotential, the height change of constant pressure surfaces, can be computed. Geopotential is computed through specific volume expansion of the fluid below a given depth due to T and S variations. For example, as temperature increases in lower water, the lower water expands. The position of geopotential (constant pressure) moves upward due to volume expansion. The cross-correlation matrix between T and S and geopotential is decomposed through an eigenvector reduction, and the most significant modes are retained. Velocity is related to geopotential through a geostrophic balance in which the Coriolis force balances horizontal pressure gradients that are horizontal slopes in the geopotential. Thus, given geopotential at any depth, the relation to T and S within the water column is known. Historical observations can provide the relations between velocity and T/S, which can prevent errors due to model drift in previously available methods.

The system of the present embodiment for correcting a vertical structure of ocean temperature and ocean salinity based on velocity observations can include, but is not limited to including, a matrix processor computing a historical covariance matrix of the vertical structure at each grid point using in situ temperature and in situ salinity. The system can further include a geopotential processor computing a vertical geopotential structure, the geopotential processor including the vertical geopotential structure in the historical covariance matrix to form a historical geopotential and T/S covariance matrix. The system can still further include a correction processor computing a horizontal geopotential structure based on the geostrophic relationship and the velocity observation. The correction processor can compute temperature and salinity in the water column based on the covariance relation between the historical geopotential and historical covariance matrix. The correction processor can still further correct a predicted temperature and a predicted salinity based on the horizontal geopotential structure, the historical geopotential, the historical covariance matrix, and the velocity observations. The geopotential processor can optionally produce a matrix of eigenvectors based on decomposing the historical covariance matrix through eigenvalue decomposition, and can store a set of most significant eigenvectors of the matrix of eigenvectors, the set being sized up to a pre-selected value. The geopotential processor can still further compute a TS standard deviation matrix of the in situ temperature and the in situ salinity, and can compute a geopotential standard deviation of the vertical geopotential structure. The geopotential processor can reconstruct the historical covariance matrix based on the set of most significant eigenvectors, the TS standard deviation matrix, and the geopotential standard deviation. The pre-selected value can be, for example, but not limited to, 6. The system can optionally include a numerical model processor executing a numerical ocean prediction model using the corrected predicted temperature and the corrected predicted salinity to produce a numerical model forecast. The numerical ocean prediction model can predict eddies based on the numerical model forecast.

The method of the present embodiment for correcting a vertical structure of ocean temperature and ocean salinity based on velocity observations can include, but is not limited to including, computing a historical covariance matrix of the vertical structure at each grid point using in situ temperature and in situ salinity, computing a vertical geopotential structure, including the vertical geopotential structure in the historical covariance matrix to form a historical geopotential and a T/S covariance matrix, computing a horizontal geopotential structure based on the geostrophic relationship and the velocity observation, computing temperature and salinity in the water column based on the covariance relation between the historical geopotential and the historical covariance matrix, and correcting a predicted temperature and a predicted salinity based on the horizontal geopotential structure, the historical geopotential, the historical covariance matrix, and the velocity observations. The method can optionally include producing a matrix of eigenvectors based on decomposing the historical covariance matrix through eigenvalue decomposition, storing a set of most significant eigenvectors of the matrix of eigenvectors, the set being sized up to a pre-selected value, computing a TS standard deviation matrix based on the in situ temperature and the in situ salinity, computing a geopotential standard deviation of the vertical geopotential structure, and reconstructing the historical covariance matrix based on the set of most significant eigenvectors, the TS standard deviation matrix, and the geopotential standard deviation. The pre-selected value can optionally be 6. The method can optionally include executing a numerical ocean prediction model using the corrected predicted temperature and the corrected predicted salinity to produce a numerical model forecast, and predicting eddies based on the numerical model forecast.

In another embodiment, a method for predicting eddies can include, but is not limited to including, applying the method for correcting a vertical structure of the ocean temperature and salinity to a numerical model forecast, and executing a numerical model including the computed temperature and the computed salinity to predict ocean eddies.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

Figure 1:
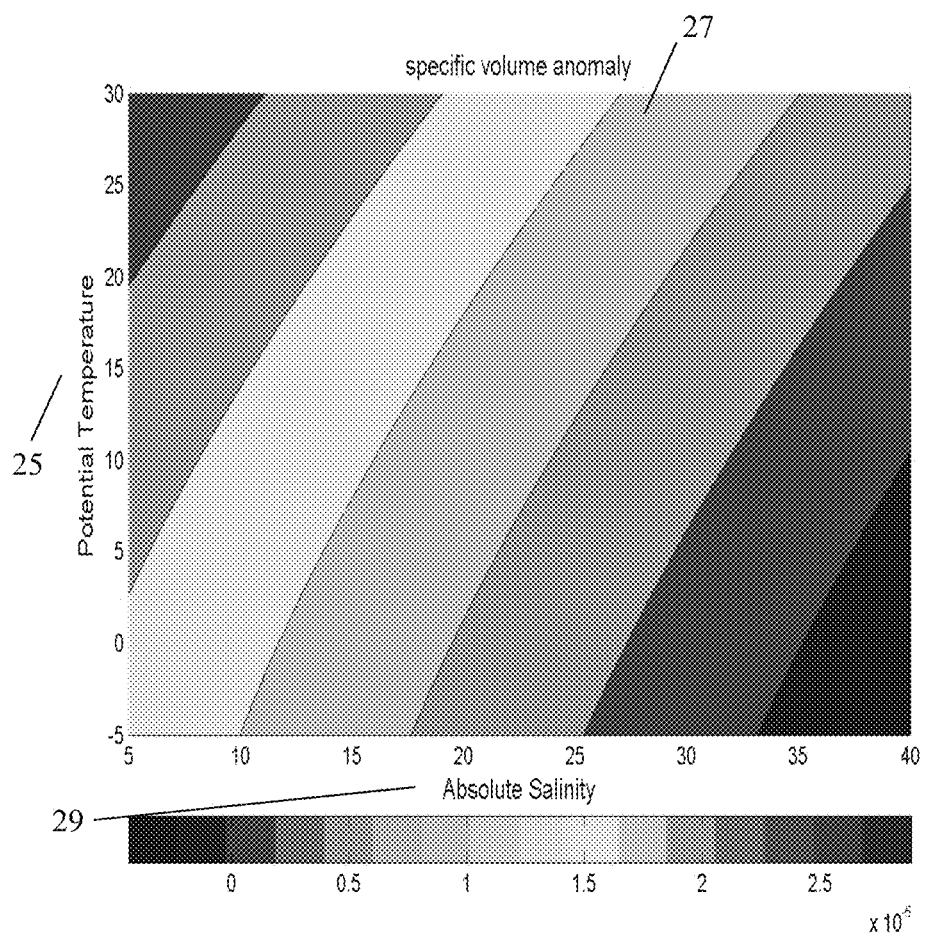
FIG. 1 is a graphical representation of specific volume anomaly as a function of absolute salinity and constant temperature in units of $m^3/kg$.

The problems set forth above as well as further and other problems are solved by the present teachings. These solutions and other advantages are achieved by the various embodiments of the teachings described herein below.

The system and method of the present embodiment can correct ocean temperature and salinity structure given velocity observations. The correction is constructed uses historical in situ observations to first compute the covariance of temperature and salinity throughout the water column, and then extend the covariance to relate temperature and salinity to geopotential, relate the covariance of geopotential to velocity through a geostrophic balance, and then relate the geopotential to temperature and salinity via the reverse application of the constructed covariances. The relation between geopotential and subsurface temperature and salinity has not been constructed previously from in situ observations, and thus it has not been possible for velocity observations to influence the temperature and salinity structure as historically observed. The derivation of the method is given below.

The derivation starts by computing the cross covariance of geopotential $\phi$, temperature T, and salinity S. Geopotential anomaly is related to T and S by integrating the specific volume anomaly from a reference level to depth z. Pressure is an integral of density times gravitational acceleration above a particular depth. The fixed vertical position is translated to a fixed parcel of material. The total mass above this fixed parcel of material is constant regardless of the variation in specific volume either below or above this parcel. Thus the pressure is constant when following this material parcel. The geopotential height is the height of this parcel that represents a particular pressure. To determine how this parcel of fixed pressure moves vertically, it is only necessary to consider the specific volume anomaly beneath the parcel. Thus, the geopotential height anomaly (height of a particular pressure level due to deviations in T and S from 0° C. and thirty-five parts per thousand, respectively) is determined by the specific volume anomaly $\delta(z)$ integrated from the ocean bottom to the pressure level of the parcel prior to displacement:

$$\phi = \int_{bottom}^{pressure_{level}} \delta(z)\,dp \qquad (1)$$

Given that the T and S variation is assumed to be 0 below a reference level, geopotential can be expressed as a vertical integral from the reference level to a specified depth:

$$\phi = \int_{ref_z}^{pressure\_level} \delta(z) dp \qquad (2)$$

The reasoning behind this assumption is not necessarily physically based but rather motivated by the available historical data set, which is only capable of extending to a depth of about 1000m on a regular basis. There is vertical structure of the ocean mesoscale field relating the T and S variations below 1000m to the variations above 1000m, and there are horizontal relations between the vertical structure such as the trailing cyclonic vortices related to the surface manifestations. Given T and S values at fixed levels, a vector $x^T = [T_1 \ldots T_N, S_1 \ldots S_N]$, where N is the number of vertical levels, can be defined. There can be a specific volume functional $\alpha$, linearized about an initial temperature and salinity that operates on x. Also a linear functional operator G can be defined that provides a vertical integral from the reference depth to all depths and thus provides the geopotential at all depths. Thus the geopotential computed from the T and S vector is:

$$\phi = G\alpha x \qquad (3)$$

G is a N×N matrix, and a is a N×2N matrix. The vector x can be extended by appending the geopotential at each depth so that $y^T = [x^T, \phi_1 \ldots \phi_N]$ so that the length of y is 3N. If the covariance of x is defined as $UBU^T$ where U is the diagonal matrix containing the standard deviations of x and B is the cross correlation matrix, the covariance of y is then $$\langle (y - \bar{y})(y - \bar{y})^T \rangle = \begin{bmatrix} UBU^T & UBU^T \alpha^T G^T \\ G\alpha UBU^T & G\alpha UBU^T \alpha^T G^T \end{bmatrix} \qquad (4)$$

The transformation from x to specific volume anomaly is provided by the operator $\alpha$. Formally, computation of specific volume anomaly from temperature and salinity is a nonlinear operation using the Thermodynamic Equation of Seawater-2010 (TEOS-10) *The international thermodynamic equation of seawater-2010: Calculation and use of thermodynamic properties, IOC, SCOR and IAPSO, 2010: Intergovernmental Oceanographic Commission, Manuals and Guides No. 56*, UNESCO (English), 196 pp. Because the transposition of $\alpha$ is necessary, it is easiest to provide $\alpha$ and its transpose by constructing a linear operator that relates temperature and salinity to specific volume anomaly. The data assimilation cycle of a numerical model forecast computes analysis increments from observation increments. The observation increments are relative to the prior forecast. If the prior forecast is relatively accurate, it can be used as the state around which the operator $\alpha$ is linearized. However, linearizing $\alpha$ is a computationally intensive process. If the linearization about the historical monthly climatology is used to linearize $\alpha$ then the computations can be conducted once and are applicable for all time. This linearization about the monthly climatology contains errors, and the error in the linearization must be considered.

Referring now to FIG. 1, at pressure 10,153 KPa (given a density of 1035 kg/m³ at a depth of 1000m), the relation between specific volume anomaly 27 and $S_A$ 29 and $T_p$ 25 computed by TEOS-10 is presented. From TEOS-10 specific volume anomaly 27 is computed as a function of absolute salinity $S_A$ 29, constant temperature $T_c$ and pressure. If the ocean models use potential temperature 25 rather than constant temperature, the datasets computed and shown in the plots are shown as functions of potential temperature 25. Conversions to constant temperature are performed for calculations in TEOS-10.

Figure 2A:
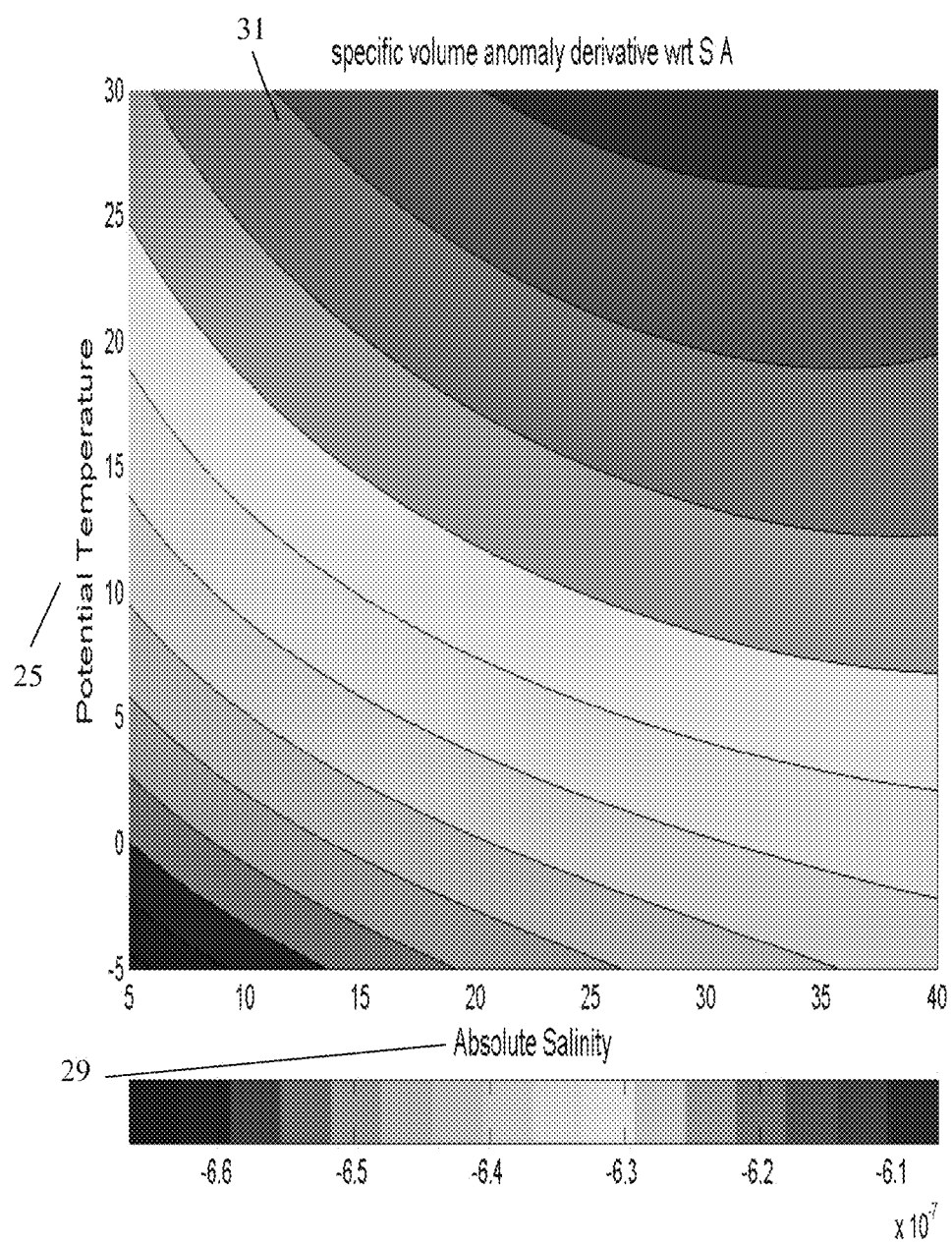
FIG. 2A is a graphical representation of the derivative of specific volume anomaly with respect to absolute salinity.
Figure 2B:
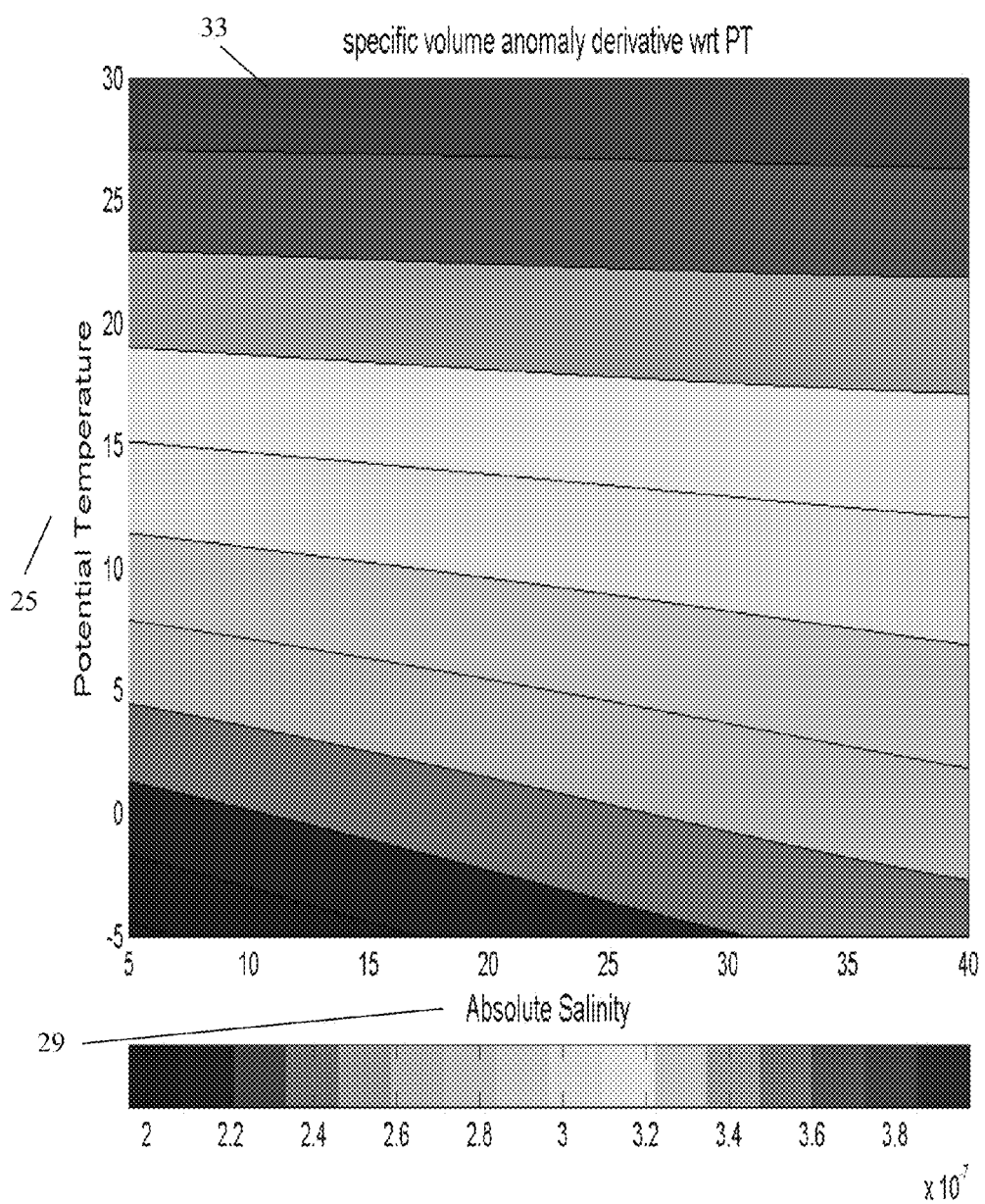
FIG. 2B is a graphical representation of the derivative of specific volume anomaly with respect to constant temperature.

Referring now to FIGS. 2A and 2B, the derivatives with respect to $S_A$ 29 and $T_p$ 25 are shown. Specific volume anomaly derivatives 31 (FIG. 2A) and 33 (FIG. 2A) with respect to $S_A$ 29 and $T_p$ 25 are computed numerically using the TEOS-10 routines. With numerically computed derivative, it is possible to consider the accuracy of a linear approximation over a given temperature or salinity increment. This is computed by using the anomaly derivatives 31 (FIG. 2A) and 33 (FIG. 2A) with respect to $S_A$ 29 and $T_p$ 25 with a specified temperature or salinity change (either 1° C. or 1 absolute salinity unit) and comparing to the value computed at the changed temperature and salinity using TEOS-10. That is, the error in assuming a local first derivative approximation is compared to the actual values.

Figure 3A:
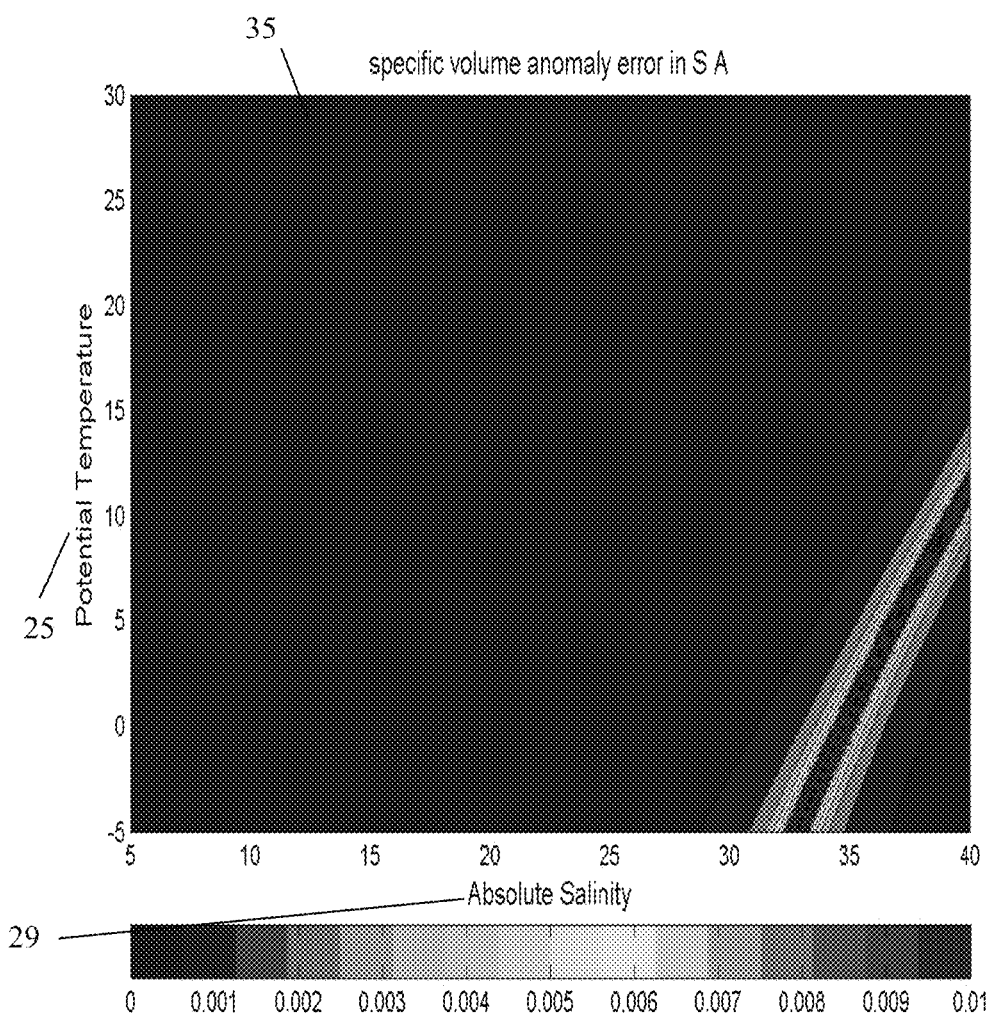
FIG. 3A is a graphical representation of the error in linearized specific volume anomaly for the derivative with respect to absolute salinity.
Figure 3B:
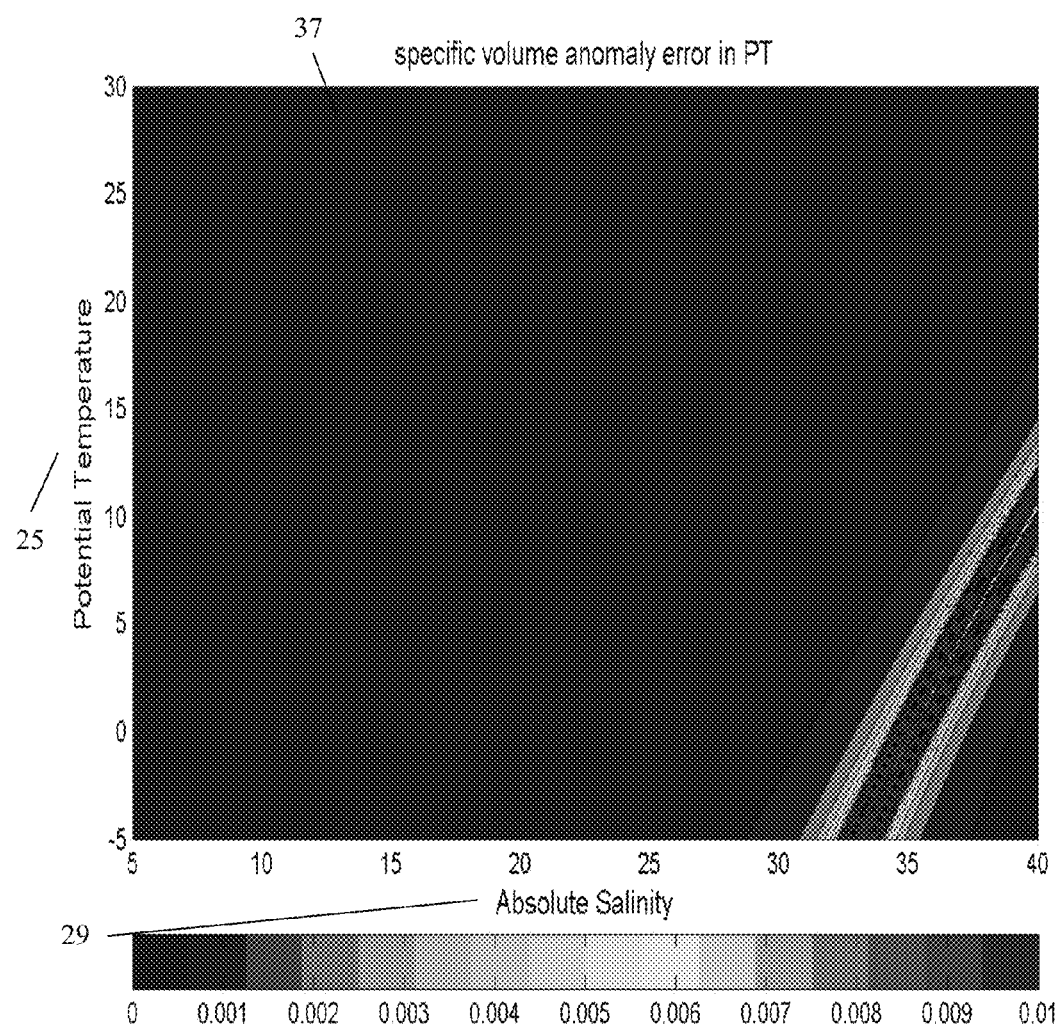
FIG. 3B is a graphical representation of the error in linearized specific volume anomaly for the derivative with respect to constant temperature—the absolute error is first computed, and this is then normalized by the local value of specific volume anomaly.

Referring now to FIGS. 3A and 3B, the normalized specific volume anomaly errors 35 (FIG. 3A) and 37 (FIG., 3B) (error divided by the specific volume anomaly) are shown. Errors 35 (FIG. 3A) and 37 (FIG., 3B) in using the first derivative with respect to either $S_A$ 35 (FIG. 3B) and $T_p$ 37 (FIG. 3B) are typically well below 1% of the specific volume anomaly. The area in which errors 35 (FIG. 3A) and 37 (FIG., 3B) are larger is where the specific volume anomaly is 0.

The vertical integration of specific volume anomaly is accomplished by the matrix g. If the ordering of T and S within x is the top of the water column in position 1 and the bottom of the water column in position N, and if pressures at the depths of the T, S, geopotential and specific volume anomalies are given by the vector $p^T$, the vertical integral can be expressed in a summation that computes a trapezoidal integration:

$$\phi_i = \sum_{j=N}^{i+1} \frac{(\delta_{j-1} + \delta_j)}{2}(p_j - p_{j-1}) \qquad (5)$$

Thus $\phi_i$ is given by:

$$\phi_i^T = \left[0, 0, 0, \ldots, \delta_i \frac{p_{i+1} - p_i}{2}, \delta_{i+1} \frac{(p_{i+2} - p_{i+1}) + (p_{i+1} - p_i)}{2}, \ldots, \delta_k \frac{(p_{k+1} - p_k) + (p_k - p_{k-1})}{2}, \ldots, \delta_N \frac{p_N - p_{N-1}}{2}\right] \qquad (6)$$

$$= \left[0, 0, 0, \ldots, \delta_i \frac{p_{i+1} - p_i}{2}, \delta_{i+1} \frac{p_{i+2} - p_i}{2}, \ldots, \delta_k \frac{p_{k+1} - p_{k-1}}{2}, \ldots, \delta_N \frac{p_N - p_{N-1}}{2}\right]$$

The coefficients of pressure for each $\delta_i$ are the elements of the g matrix. In the case of $\phi_i$ for i=N, $g_i$, is a null vector since the geopotential anomaly at the reference level is zero. This is a simplifying assumption as an initial step. It assumes the model background solution below the reference depth is correct.

The covariance for T and S is based on the Improved Synthetic Ocean Profile (ISOP, Helber et al., ISOP VTR NRL formal report, submitted 2013) that provides the matrix B of equation (4). The extension here is provided by appending the geopotential covariance based on (6). In the typical ocean analysis data assimilation, velocity is related to surface geopotential through a geostrophic balance. However, there has not been a means to relate the geopotential to the T and S structure throughout the water column. By relating geopotential to the underlying T and S structure, a velocity observation is able to extend its influence range under the assumption of geostrophic balance in accordance with historical variability in T and S.

Figure 4:
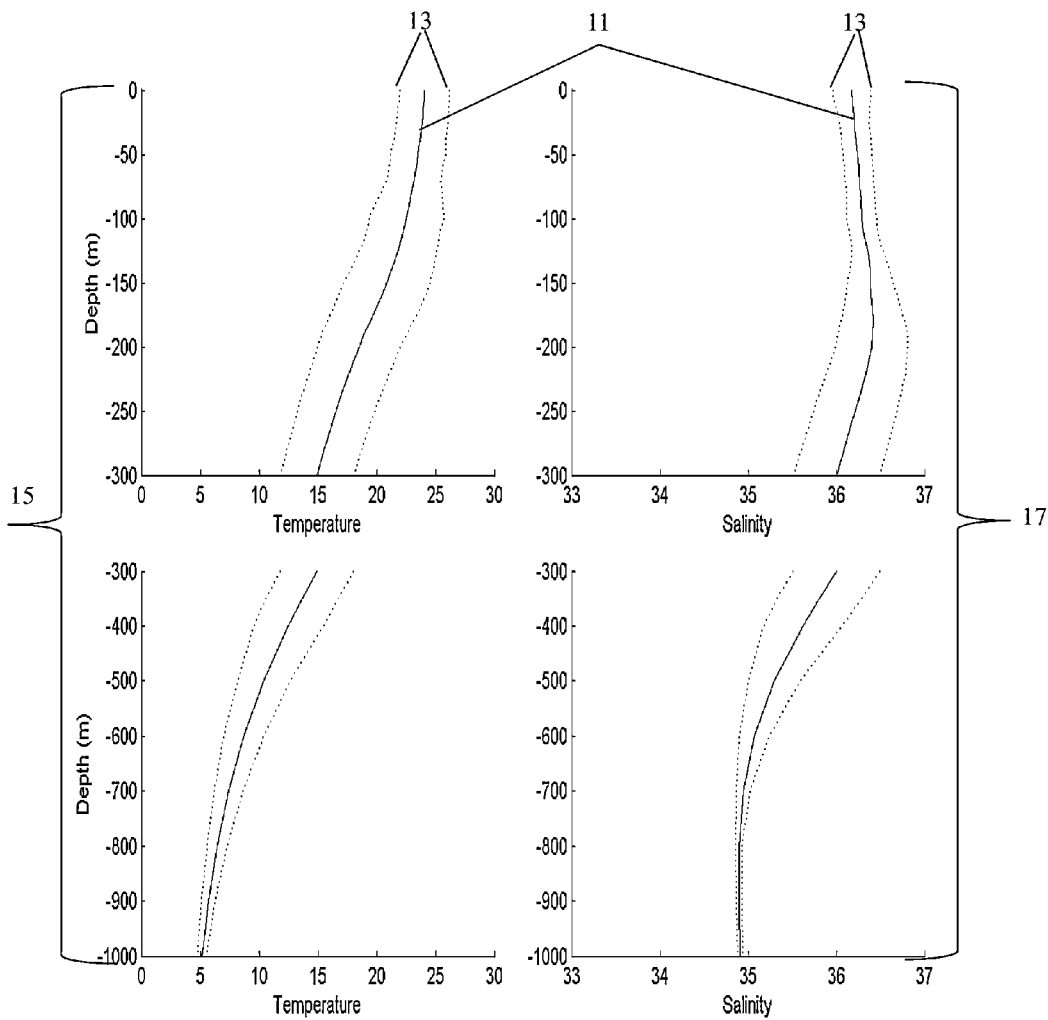
FIG. 4 is a graphical representation of the mean T and S for January from the Improved Synthetic Ocean Profile (ISOP) data base.

Referring now to FIG. 4, an example of the vertical covariance structure is provided during January at 275° E, 24° N. The vertical scale is separated into two portions to better show the upper water column. The vertical structure of mean 11 and one standard deviation 13 of temperature 15 and salinity 17 are shown. Mean 11 is based on all historical in situ data taken during January. Each month has an equivalently constructed set of information on the mean and variances information. The location, 275° E, 24° N, is just northeast of Cuba in the Gulf of Mexico. Salinity 17 shows the characteristic subsurface maximum at about 200m depth. Mean 11 is subtracted from historical in situ data, and the cross correlation between T and S at all depths is constructed. This provides the B matrix at every latitude and longitude 47 point. The B matrix is decomposed through an eigenvalue decomposition to produce $B = \Gamma \Lambda \Gamma^T$ where $\Gamma$ is the matrix of eigenvectors and $\Lambda$ is a diagonal matrix of eigenvalues. To significantly reduce the data storage requirements, the most significant eigenvectors are saved and stored. In an exemplary embodiment, temperature and salinity are stored at forty-seven standard depths. In this example, to fully store B would require 47×47 values at every latitude and longitude. If the most significant eigenvectors are retained up to a maximum of six, storage requirements can be reduced by a factor of eight. Choosing the most significant eigenvectors does not fundamentally change the derivation of the cross covariance matrix between T,S and $\phi$ in Eqn. (4), but it does change how the information is formulated and stored. For example, the term in Eqn. (4)

$$G\alpha UBU^T\alpha^T G^T = G\alpha U\Gamma\Lambda\Gamma^T U^T\alpha^T G^T \quad (7)$$

is stored as the vertical pressure integration and specific volume anomaly operating on the T and S eigenvectors:

$$G\alpha\Gamma \quad (8)$$

which is possible since the standard deviation matrix U is diagonal. Thus the cross correlation matrix between T, S and $\phi$ can be reconstructed based on stored eigenvectors and eigenvalues.

Figure 5:
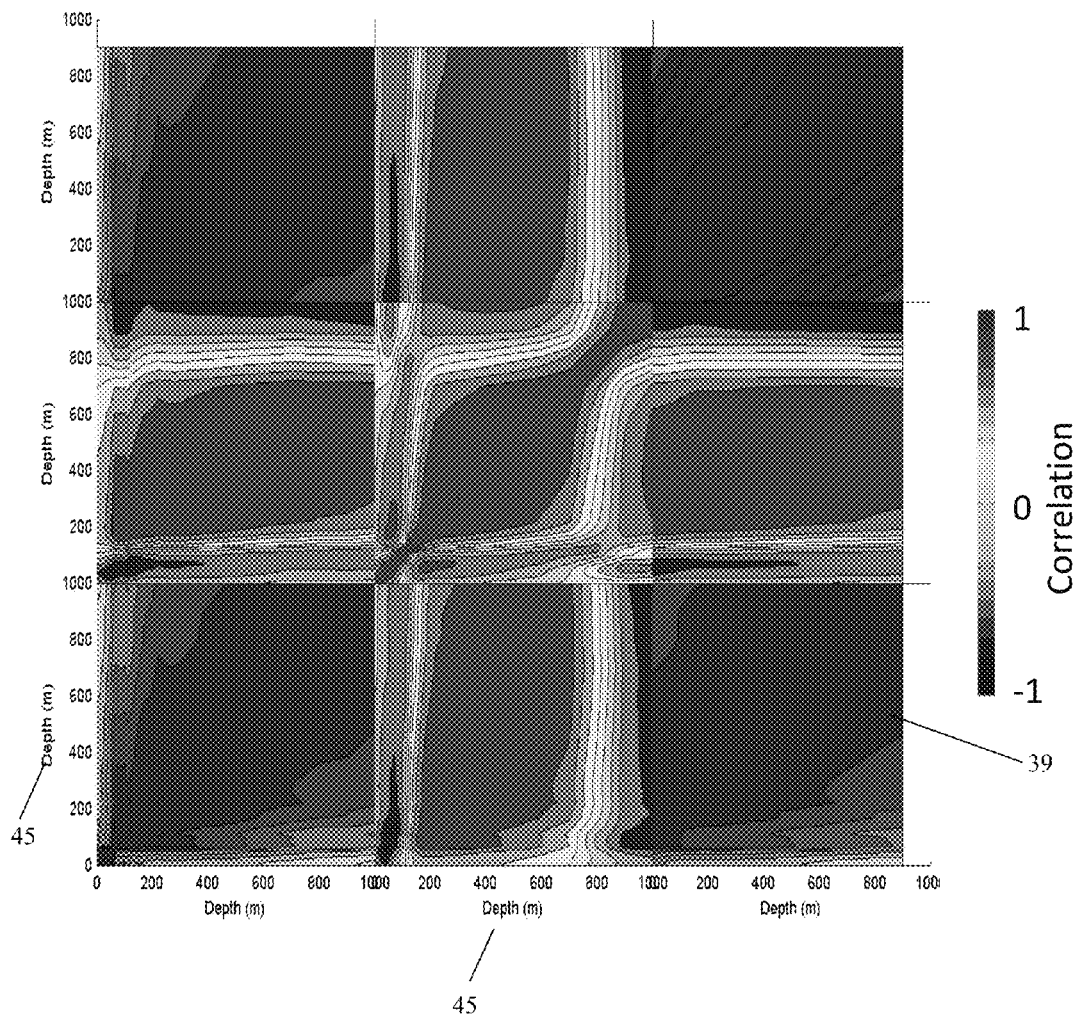
FIG. 5 is a graphical representation of the cross correlation matrix constructed by extending the existing ISOP T and S to include geopotential.

Referring now to FIG. 5, an example of the cross correlation matrix 39 at 275° E, 24° N for January is shown. Exemplary cross correlation matrix 39 is computed from the eigenvector and eigenvalue information stored in the ISOP data files. In the exemplary embodiment each month of the year can be stored as a separate file, and the eigen information can be stored on a 0.5° grid covering the globe. Shown is a color bar range from −1(blue) to +1(red). The exemplary matrix provides the relations between any of the three variables T, S and $\phi$ at any depth 45. Thus, given one variable at a particular depth 45, it is straight forward to determine the correlation to any other variable at any other depth 45.

Figure 6:
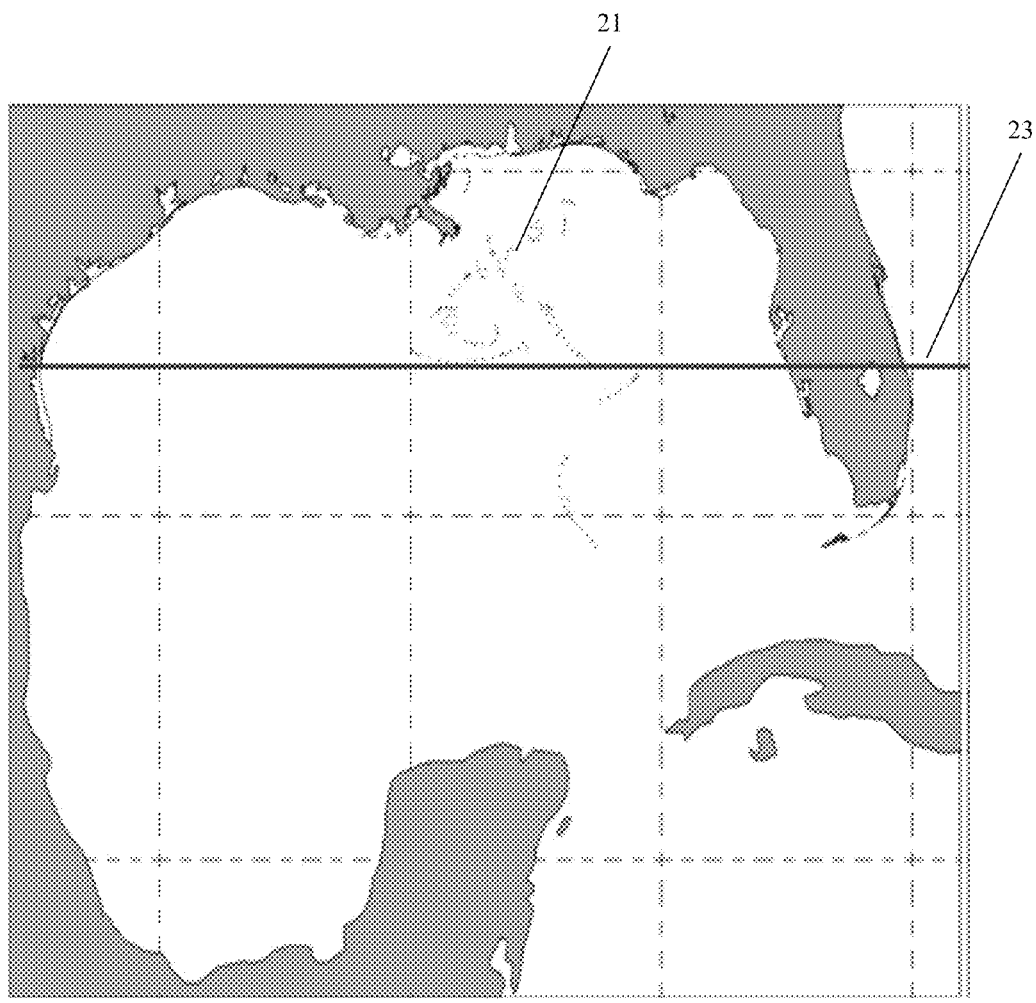
FIG. 6 is a graphical representation of the distribution of velocity observations on Aug. 1, 2012 from the GLAD experiment; The red line denotes the vertical slice used for the graphics in FIGS. 7A-7C.

Referring now to FIG. 6, the distribution of velocity observations 21 on Aug. 1, 2012 from a drifter deployment during July through October 2012 is shown. The velocity observations were part of the Grand LAgrangian Drifter (GLAD) experiment which was part of the Consortium on Advanced Transport of Hydrocarbons in the Environment (CARTHE). For the GLAD experiment, three hundred drifters were deployed in the northern Gulf of Mexico. A model experiment was run from May through July assimilating all available public data streams including satellite sea surface temperature (SST) and sea surface height (SSH) up to the time of the deployment. At the time of deployment a second experiment was started using the model initial state at the time (Jul. 20, 2012). The second experiment assimilated only the drifter inferred velocity. Line 23 is a location at which increment fields 49 (FIG. 7A), 51 (FIG. 7B), and 53 (FIG. 7C) are plotted in FIGS. 7A-7C.

Figure 7A:
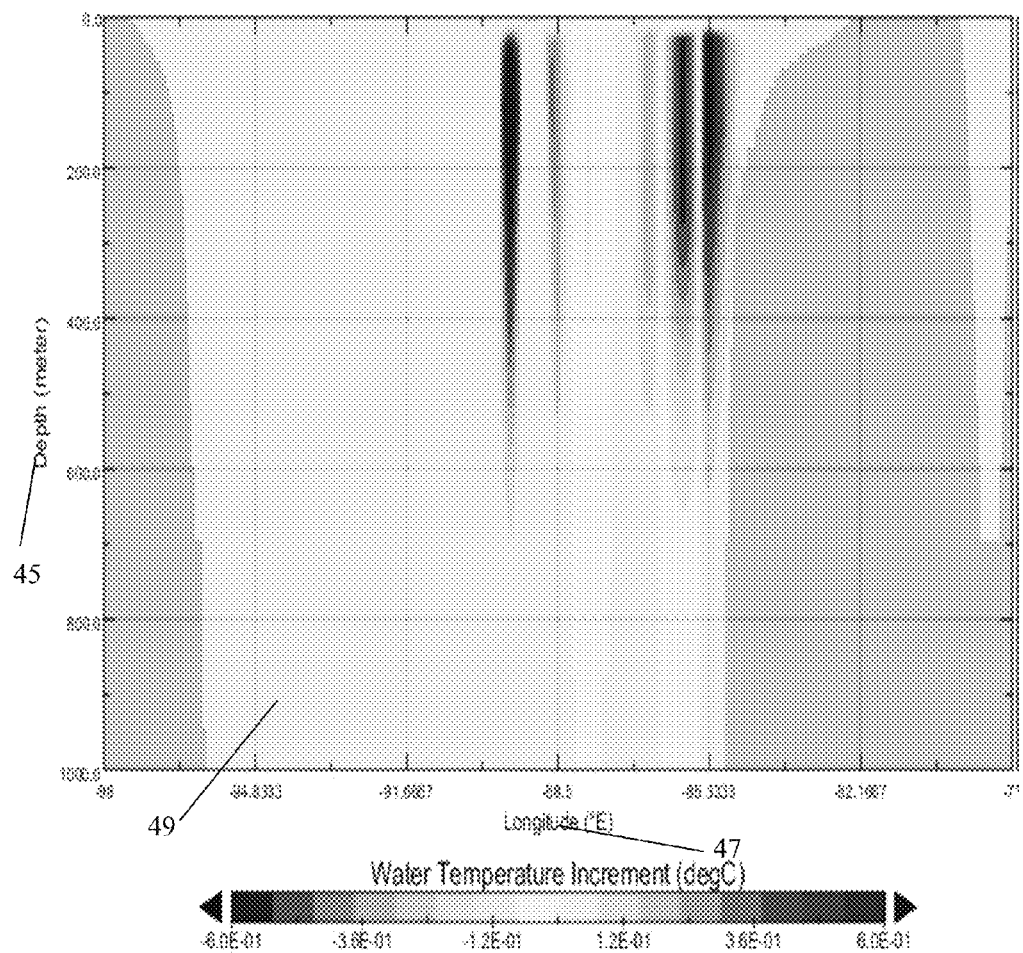
FIGS. 7A-7C are graphical representations of the temperature, salinity, and geopotential analysis increments provided by the velocity observations.
Figure 7B:
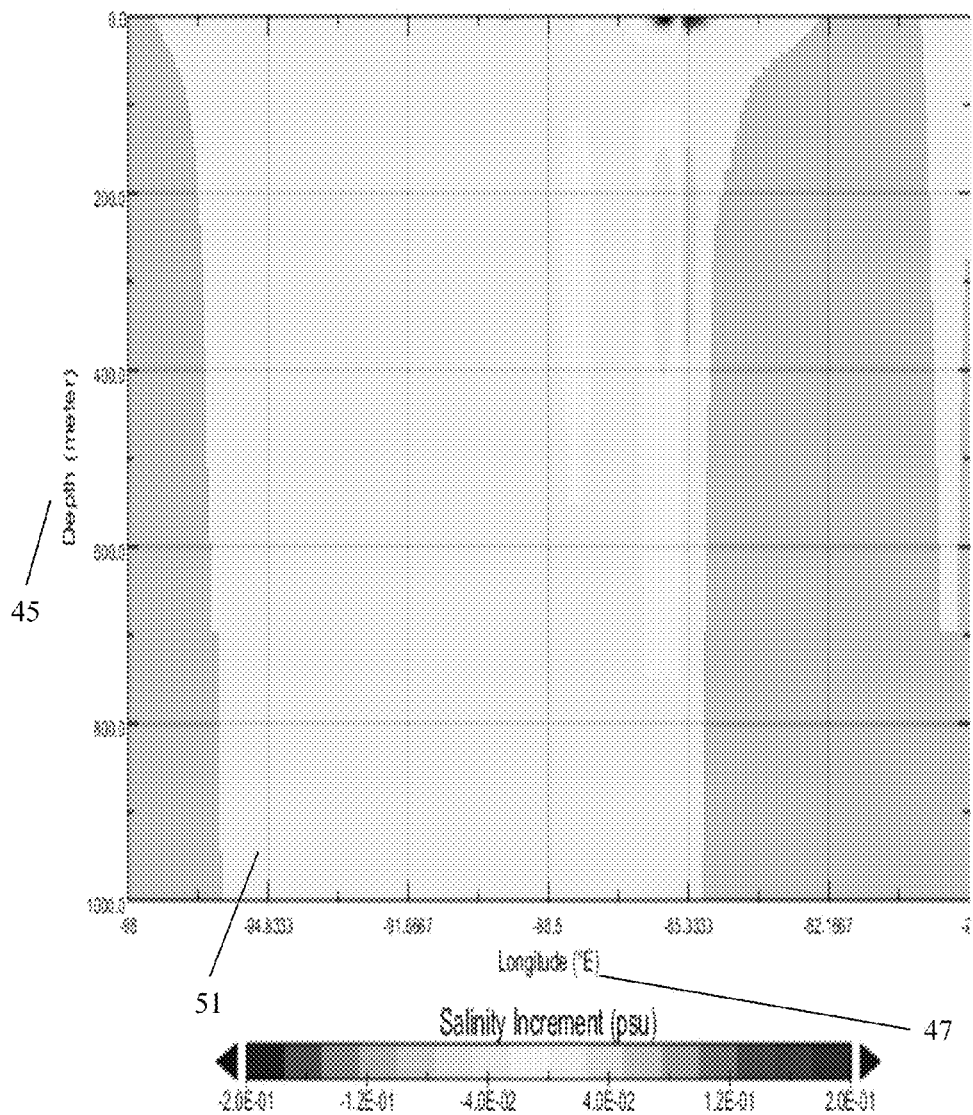
Figure 7C:
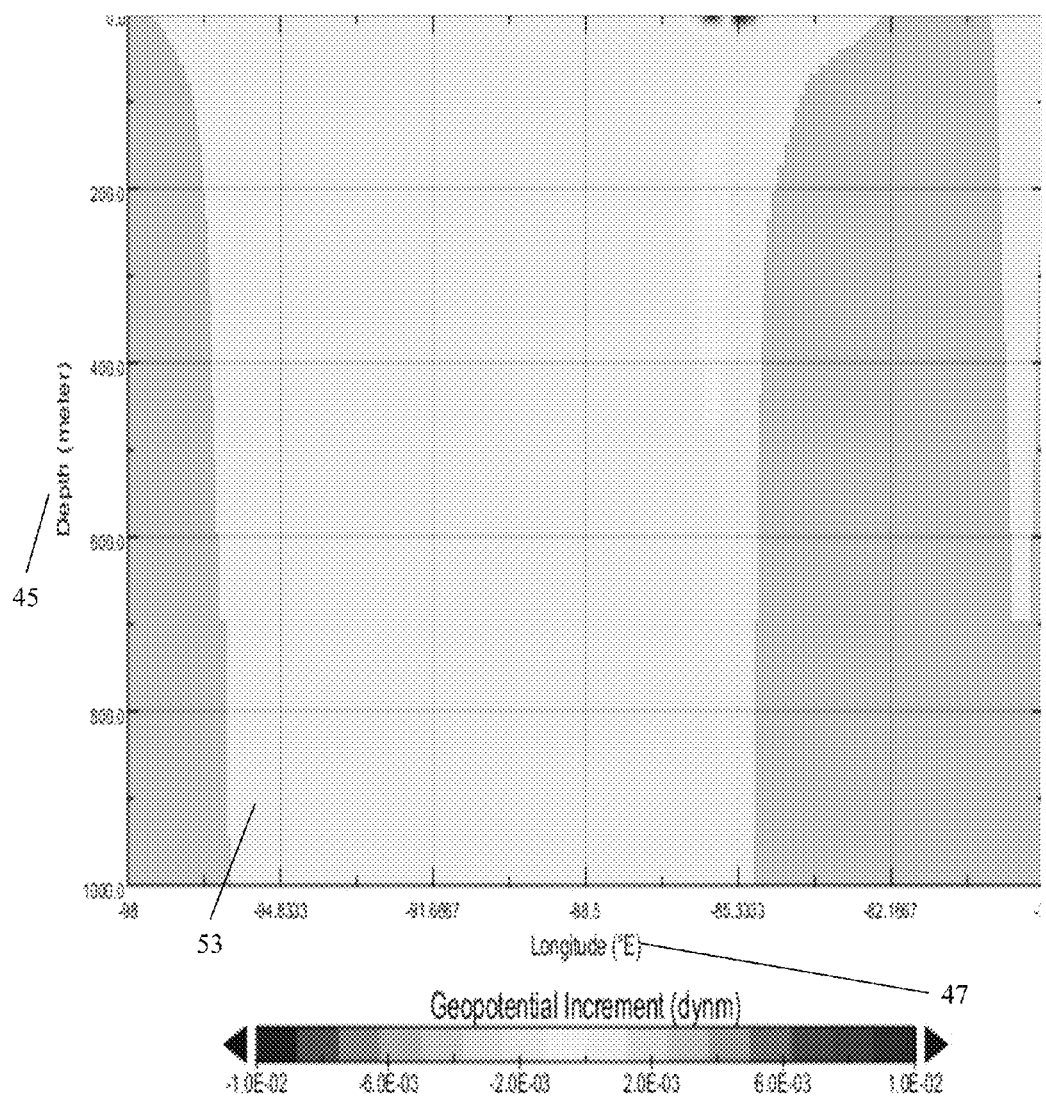

Referring now to FIGS. 7A-7C, FIG. 7A shows temperature increment 49, FIG. 7B shows salinity increment 51, and FIG. 7C shows geopotential increment 53 provided by the assimilation of only velocity observations 21 (FIG. 6). These charts demonstrate the impact throughout the water column on temperature and salinity due to the surface velocity observations 21 (FIG. 6). Velocity observations 21 (FIG. 6) are used on a daily basis to correct the model initial conditions for the day using the geopotential to T and S relations constructed in Eqn. (8).

Figure 8:
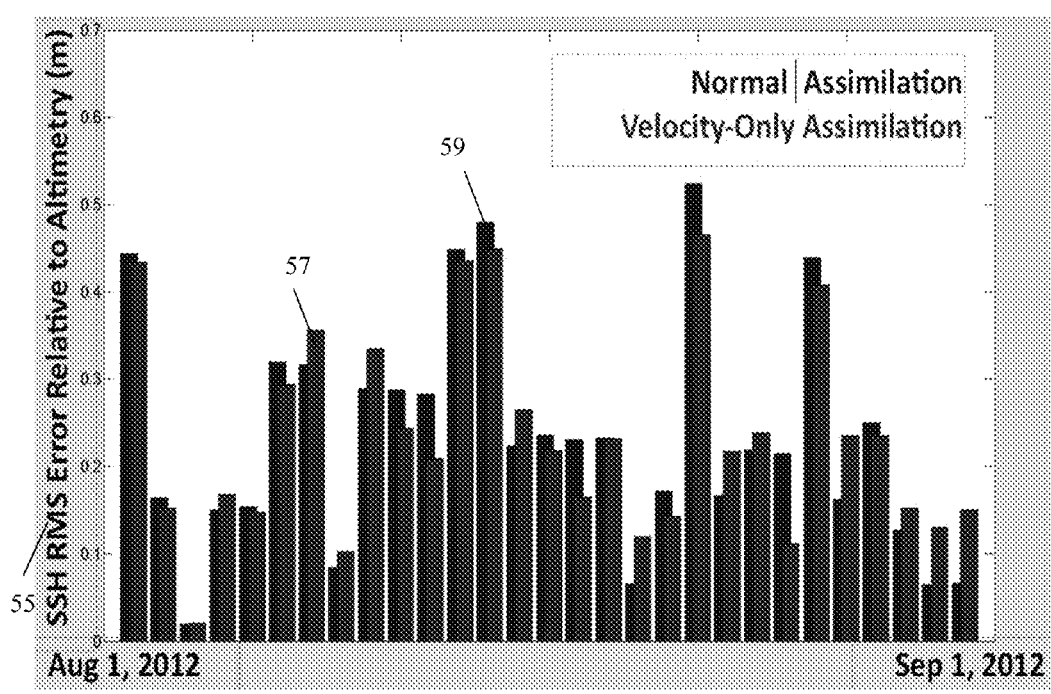
FIG. 8 is a graphical representation of the sea surface height (SSH) errors from two experiments showing the impact of velocity assimilation on forecast accuracy.

Referring now to FIG. 8, shown is the impact of velocity-only assimilation 57 versus normal assimilation 59 on forecast accuracy, in particular, the comparison of sea surface height (SSH) errors 55 from two experiments from Aug. 10-20, 2012. The normal assimilation experiment assimilated all publicly available data, while the velocity-only experiment assimilated only the drifter data. Both experiments are compared to the satellite SSH. The velocity-only experiment provides a better match to the satellite SSH than the normal assimilation experiment and contains lower errors.

Figure 9:
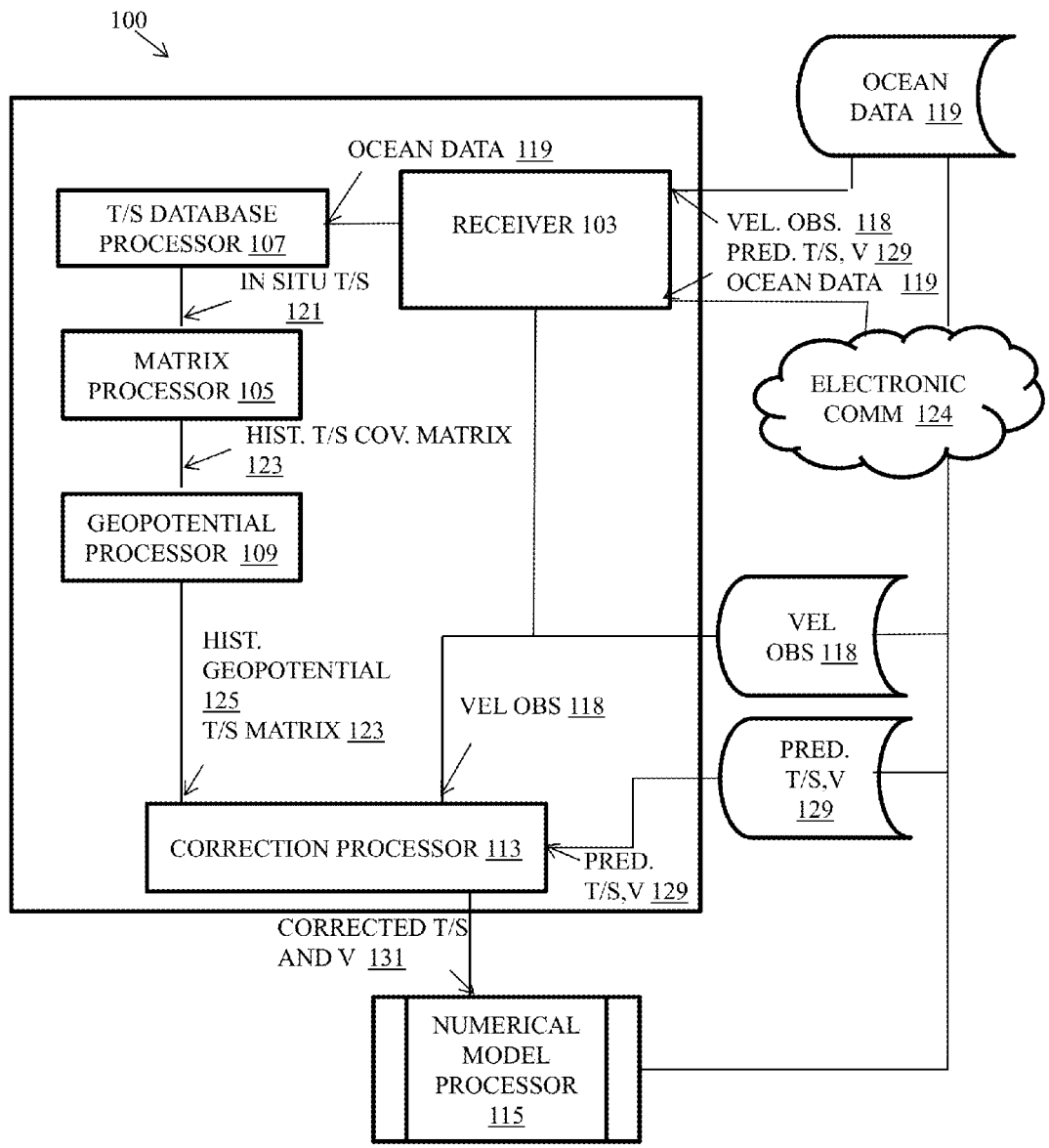
FIG. 9 is a schematic block diagram of the system of the present embodiment.

Referring now to FIG. 9, system 100 for correcting a predicted vertical structure of ocean temperature/salinity (T/S) and velocity 129 based on velocity observations 118 can include, but is not limited to including, receiver 103 receiving ocean data 119, predicted temperature, salinity, and velocity 129, and velocity observations 118. System 100 can further include T/S database processor 107 receiving ocean data 119 from receiver 103, and matrix processor 105 receiving in situ temperature and salinity 121 from temperature/salinity database processor 107. Matrix processor 105 can compute historical covariance matrix 123 of from the vertical structure of ocean data 119 at each grid point. System 100 can further include geopotential processor 109 computing a vertical geopotential structure, geopotential processor 109 can include the vertical geopotential structure in historical covariance matrix 123 to form historical geopotential 125 and temperature/salinity matrix 123. System 100 can still further include correction processor 113 computing a horizontal geopotential structure based on the geostrophic relationship and velocity observations 118. Correction processor 113 can receive predicted T/S and velocity 129 from, for example, but not limited to, numerical model processor 115 and/or ocean data 119, through, for example, but not limited to, receiver 103, which receives these parameters, for example, but not limited to, directly from sensors or databases, and/or through electronic communications 124. Correction processor 113 can compute temperature and salinity in the water column based on the covariance relationship between historical geopotential 125 and T/S covariance matrix 123. Correction processor 113 can correct predicted T/S 129 based on the horizontal geopotential structure, historical geopotential 125, T/S covariance matrix 123, and velocity observations 118 to form corrected T/S and velocity 131.

Continuing to refer to FIG. 9, geopotential processor 109 can optionally produce a matrix of eigenvectors based on decomposing historical T/S covariance matrix 123 through eigenvalue decomposition, store the most significant eigenvectors up to a pre-selected value, compute a TS standard deviation matrix of the in situ T/S observations 121, compute a geopotential standard deviation of the vertical geopotential structure, and reconstruct historical covariance matrix 123 based on the most significant eigenvectors, the TS standard deviation matrix, and the geopotential standard deviation. The pre-selected value can be, for example, but not limited to, 6. System 100 can optionally include numerical model processor 115 executing a numerical ocean prediction model using corrected predicted T/S and velocity 131 to produce a numerical model forecast, the numerical ocean prediction model predicting eddies based on the numerical model forecast.

Figure 10:
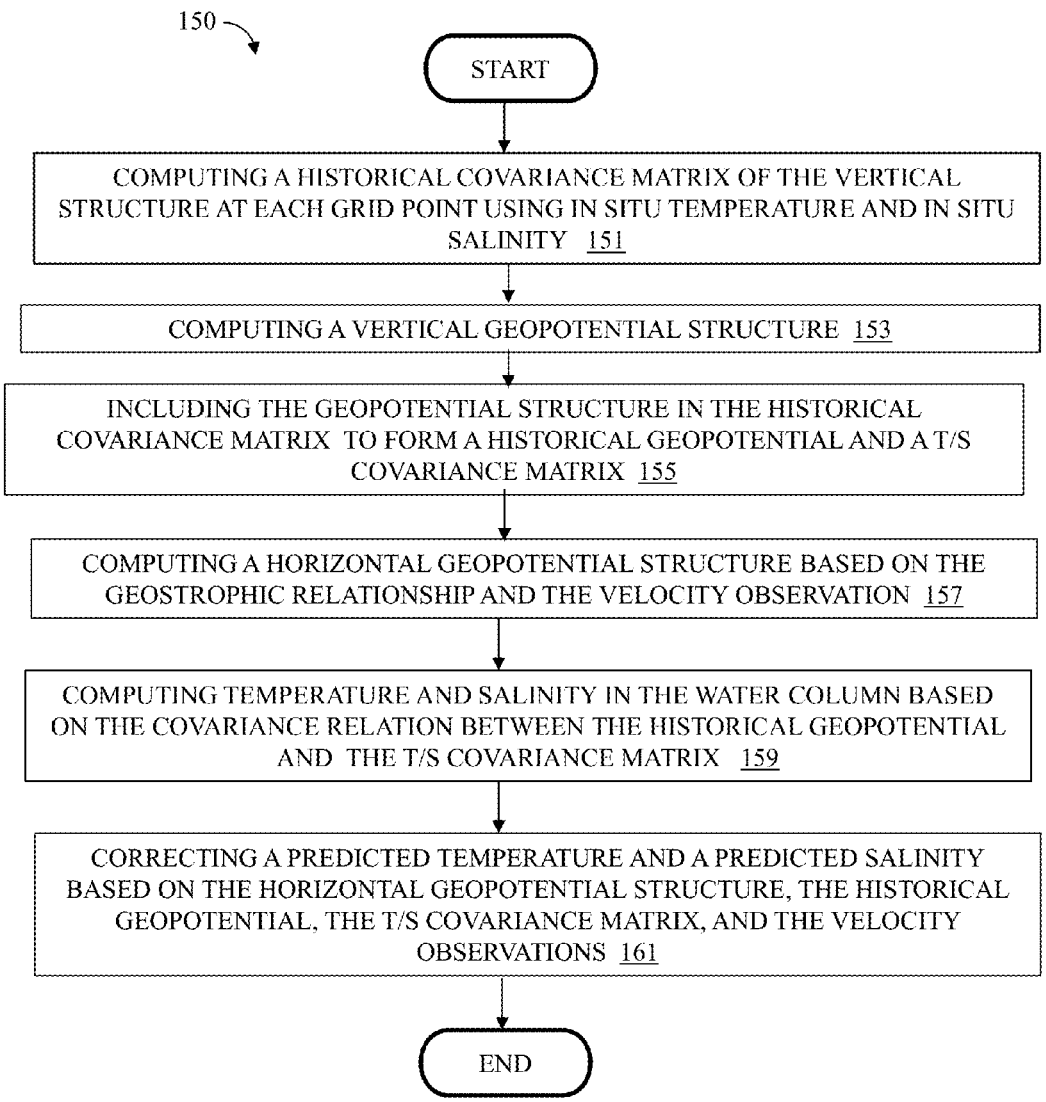
FIG. 10 is a flowchart of the method of the present embodiment.

Referring now primarily to FIG. 10, method 150 (FIG. 10) for correcting the vertical structure of the ocean temperature and salinity based on velocity observations 118 can include, but is not limited to including, computing 151 historical covariance matrix 123 (FIG. 9) of vertical ocean data 119 (FIG. 9) at each grid point using in situ temperature and salinity 121 (FIG. 9), computing 153 vertical geopotential structure, including 155 the vertical geopotential structure in the historical covariance matrix 123 (FIG. 9) to form historical geopotential 125 and T/S covariance matrix 123 (FIG. 9), computing 157 a horizontal geopotential structure based on the geostrophic relationship and velocity observations 118 (FIG. 9), computing 159 temperature and salinity in the water column based on the covariance relation between the historical geopotential and T/S covariance matrix 125 (FIG. 9), and correcting 161 predicted temperature/salinity 129 (FIG. 9) based on horizontal geopotential structure, historical geopotential 125 (FIG. 9), T/S covariance matrix 123 (FIG. 9), and velocity observations 118 (FIG. 9). Method 150 can optionally produce a matrix of eigenvectors based on decomposing historical covariance matrix 123 (FIG. 9) through an eigenvalue decomposition, store a set of the most significant eigenvectors up to a pre-selected value, and compute a TS standard deviation matrix of the historical temperature and salinity observations along with a geopotential standard deviation of corresponding vertical geopotential structure, and reconstruct historical covariance matrix 123 (FIG. 9) based on the set of most significant eigenvectors, the TS standard deviation matrix, and the geopotential standard deviation. Method 150 can further optionally include executing a numerical ocean prediction model using corrected predicted temperature 131 and corrected predicted salinity 131 to produce a numerical model forecast, and predicting eddies based on the numerical model forecast.

Embodiments of the present teachings are directed to computer systems such as system 100 (FIG. 9) for accomplishing the methods such as method 150 (FIG. 10) discussed in the description herein, and to computer readable media containing programs for accomplishing these methods. The raw data and results can be stored for future retrieval and processing, printed, displayed, transferred to another computer, and/or transferred elsewhere. Communications links such as electronic communications 124 (FIG. 9) can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Methods such as method 150 (FIG. 10) of the present embodiment can be, in whole or in part, implemented electronically. Signals representing actions taken by elements of the system and other disclosed embodiments can travel over at least one live communications network 124 (FIG. 9). Control and data information can be electronically executed and stored on at least one computer-readable medium. System 100 (FIG. 9) can be implemented to execute on at least one computer node in at least one live communications network 124 (FIG. 9). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A method for predicting eddies comprising:
computing a historical covariance matrix of a vertical structure of ocean temperature and ocean salinity at each grid point using in situ temperature and in situ salinity, wherein the in situ temperature and the in situ salinity are obtained from a plurality of sensors deployed at a geographic location;
computing geopotential heights along a water column at the geographic location based on the vertical structure;
including the geopotential height anomalies in the historical covariance matrix to determine a historical geopotential;
computing horizontal relationships for the historical geopotential between the geopotential height anomalies and velocity observations from the geographic location;
obtaining a predicted temperature and a predicted salinity in the water column from a database;
correcting the predicted temperature and the predicted salinity in the water column based on a covariance relationship of the ocean temperature and ocean salinity between the historical geopotential and the historical covariance matrix;

using the corrected predicted temperature and the corrected predicted salinity to generate a numerical model forecast for the geographic location; and predicting the eddies at the geographic location based on the numerical model forecast.

2. The method as in claim 1 further comprising:

producing a matrix of eigenvectors based on decomposing the historical covariance matrix through eigenvalue decomposition;

storing a set of most significant eigenvectors of the matrix of eigenvectors, the set being sized up to a pre-selected value;

computing a TS standard deviation matrix based on the in situ temperature and the in situ salinity;

computing a geopotential standard deviation of the geopotential height anomalies; and reconstructing the historical covariance matrix based on the set of most significant eigenvectors, the TS standard deviation matrix, and the geopotential standard deviation.

3. A system for predicting eddies comprising:

a matrix processor computing a historical covariance matrix of a vertical structure of ocean temperature and ocean salinity at each grid point using in situ temperature and in situ salinity, wherein the in situ temperature and the in situ salinity are obtained from a plurality of sensors deployed at a geographic location;

a geopotential processor computing geopotential heights along a water column at the geographic location based on the vertical structure, the geopotential processor including the geopotential height anomalies in the historical covariance matrix to determine a historical geopotential;

a correction processor computing horizontal relationships for the historical geopotential between the geopotential height anomalies and velocity observations from the geographic location, the correction processor obtaining a predicted temperature and a predicted salinity in the water column from a database, the correction processor correcting the predicted temperature and the predicted salinity in the water column based on a covariance relationship of the ocean temperature and ocean salinity between the historical geopotential and historical covariance matrix, and a numerical model processor using the corrected predicted temperature and the corrected predicted salinity to generate a numerical model forecast for the geographic location, the numerical ocean prediction model predicting the eddies at the geographic location based on the numerical model forecast.

4. The system as in claim 3 wherein the geopotential processor comprises producing a matrix of eigenvectors based on decomposing the historical covariance matrix through eigenvalue decomposition, storing a set of most significant eigenvectors of the matrix of eignevectors, the set being sized up to a pre-selected value, computing a TS standard deviation matrix of the in situ temperature and the in situ salinity, computing a geopotential standard deviation of the vertical geopotential structure, and reconstructing the historical covariance matrix based on the set of most significant eigenvectors, the TS standard deviation matrix, and the geopotential standard deviation.

5. The method as in claim 2 wherein the pre-selected value is 6.

6. The system as in claim 4 wherein the pre-selected value is 6.

7. A computer system for predicting eddies comprising computer instructions stored on non-transitory computer readable media to:

compute a historical covariance matrix of a vertical structure of ocean temperature and ocean salinity at each grid point using in situ temperature and in situ salinity, wherein the in situ temperature and the in situ salinity are obtained from a plurality of sensors deployed at a geographic location;

compute geopotential heights along a water column at the geographic location based on the vertical structure;

include the geopotential height anomalies in the historical covariance matrix to determine a historical geopotential;

compute horizontal relationships for the historical geopotential between the geopotential height anomalies and velocity observations from the geographic location;

obtain a predicted temperature and a predicted salinity in the water column from a database;

correct the predicted temperature and the predicted salinity in the water column based on a covariance relationship of the ocean temperature and ocean salinity between the historical geopotential and the historical covariance matrix;

use the corrected predicted temperature and the corrected predicted salinity to generate a numerical model forecast for the geographic location; and predict the eddies at the geographic location based on the numerical model forecast.

8. The computer system as in claim 7 further comprising computer instructions stored on non-transitory computer readable media to:

produce a matrix of eigenvectors based on decomposing the historical covariance matrix through eigenvalue decomposition;

store the most significant eigenvectors of the matrix of eigenvectors, the set being sized up to a pre-selected value;

compute a TS standard deviation matrix of the in situ temperature and the in situ salinity observations;

compute a geopotential standard deviation of the vertical geopotential structure; and reconstruct the historical covariance matrix based on the most significant eigenvectors, the TS standard deviation matrix, and the geopotential standard deviation.

9. The computer system as in claim 8 wherein the pre-selected value is 6.

* * * * *